UNITED STATES PATENT OFFICE 2,572,560

COPOLYMERS OF ACRYLONITRILE AND QUATERNARY AMMONIUM SALTS CONTAINING POLYMERIZABLE VINYL SUBSTITUENTS

George E. Ham, Dayton, Ohio, assignor to Monsanto Chemical Company, St. Louis, Mo., a corporation of Delaware No Drawing. Application October 25, 1949,
Serial No. 123,522

8 Claims. (Cl. 260—85.5)

This invention relates to new fiber forming copolymers. More particularly this invention relates to copolymers of acrylonitrile and quaternary ammonium salts containing polymerizable vinyl substituents.

In copending application Serial No. 106,490, filed July 23, 1949, by George E. Ham, there are described and claimed methods of making dyeable copolymers by polymerizing acrylonitrile with vinyl esters of halogen substituted carboxylic acids and thereafter reacting the copolymer with an amine or ammonia to form substituted ammonium groups. In accordance with the method described in the said patent application the polymers of acrylonitrile and vinyl esters of a halogen substituted acid may be treated in solid granular form as produced by the polymerization procedure. Alternatively the polymer may be treated in solution in a suitable solvent for the fiber forming acrylonitrile polymer, for example N,N-dimethylformamide, N,N-dimethylacetamide, N,N-dimethylmethoxyacetamide, butyrolacetone, ethylene carbonate, and α-cyanoacetamide. By an additional alternative procedure the copolymers of acrylonitrile and the vinyl esters of halogen substituted carboxylic acid may be dissolved in a conventional solvent for the copolymer, extruded by the conventional fiber forming methods, and thereafter reacted with the amine or ammonia. By all of these procedures described in the pending application, one hundred per cent reactivity of the amine or ammonia with the halogen containing ester is not possible. When a solid polymer is being treated, the reaction is probably only a surface effect, and where the copolymer is treated in dilute solution it is difficult to attain substantially complete reaction. Accordingly, the prior art procedure usually requires a copolymer of a higher chlorine content in order to enable the substitution of sufficient substituted ammonium groups in the polymer to develop adequate dye receptivity.

The primary purpose of this invention is to provide a means of forming copolymers with all or substantially all of the halogen in the form of the quaternary ammonium salt radicals. A further purpose of the invention is to provide by a direct polymerization procedure, dyeable acrylonitrile copolymers. A still further purpose of this invention is to prepare improved general purpose fibers by a procedure involving the minimum number of simple steps.

In copending application Serial No. 123,523, filed concurrently herewith by David T. Mowry and Eugene L. Ringwald, there are described and claimed new olefinic monomers containing quaternary ammonium groups. These new compounds are prepared by reacting vinyl esters of α-halogen substituted carboxylic acids with tertiary amines, and are the (carbovinyloxyalkyl)-trialkyl ammonium halides.

In accordance with the present invention it has been found that the new vinyl esters containing quaternary ammonium salt substituents may be polymerized with acrylonitrile. By this procedure optimum fiber forming copolymers are formed, which copolymers are capable of being dyed without subsequent treatment of copolymer or fiber. The new copolymers are those of 75 to 98 percent of acrylonitrile and from two to 25 percent of the vinyl esters containing quaternary ammonium substituents. Preferred compositions of optimum value in the fabrication of synthetic fibers are the copolymers of 80 to 95 percent of acrylonitrile and from five to 20 percent of the vinyl esters.

Suitable vinyl esters for the practice of this invention are those represented by the following structural formula:

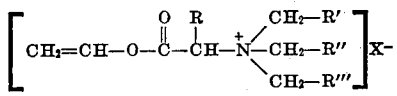

wherein R', R" and R''' are radicals of the group consisting of hydrogen, methyl, and hydroxymethyl, R is a radical of the group consisting of hydrogen and alkyl radicals having up to six carbon atoms, and X is a halogen of the group consisting of chlorine, bromine, and iodine.

The vinyl esters of the quaternary amine salt acids may be prepared by a variety of methods. In copending application Serial No. 123,523, filed October 25, 1949 by David T. Mowry and Eugene L. Ringwald, some of these compounds and a method of production by reaction of vinyl α-haloacetate with tertiary amines, such as trimethylamine and triethylamine, are described and claimed. Salts of other α-haloacid esters may be prepared by the same or other methods.

The new copolymers are prepared by polymerization in an aqueous medium in the presence of a suitable free radical catalyst and, if desired, in the presence of a dispersing agent. The polymerization usually involves heating a mixture of the monomers, water and catalyst in such a manner as to promote a controlled reaction of the monomer and the formation of a copolymer of uniform physical and chemical properties.

The methods of preparation of the new copolymers depend upon the physical nature of the monomers and the proportions desired in the copolymer. Many of the quaternary amine salts are soluble in the acrylonitrile in the proportions desired in the ultimate copolymer. Under such conditions the monomers may be mixed and added gradually to an aqueous medium containing the other essential reactants. If the quaternary amine salt is not soluble in the acrylonitrile in the proportions desired in the ultimate copolymer, it will usually be soluble in water. Under the latter conditions the acrylonitrile and an aqueous solution of the quaternary amine salt are added separately by means of continuous streams, providing a mixture of monomers within the reactor in the proportion desired in the copolymer.

The polymerization reaction may be catalyzed by means of any free radical producing substance which is soluble in the polymerization medium. Suitable catalysts include water soluble peroxy compounds, for example hydrogen peroxide, sodium peroxide, salts of the various peroxy acids, such as potassium persulfate, sodium perborate, sodium persulfate and other alkali metal salts of peroxy acids, or other water soluble peroxy compounds. Another important class of catalysts are the azo catalysts, such as 2,2'-diisobutyronitrile. A wide variation in concentration of catalysts may be used depending upon the temperature at which the reaction is to be conducted, the concentration of the monomers in the reaction mass, and the molecular weight desired in the ultimate product. From 0.01 to 5 percent of the weight of the monomers may be used. In general it is desirable to have a uniform reaction rate and therefore a substantially uniform concentration of the catalyst is desired throughout the reaction. The latter condition may be achieved by adding an aqueous solution of the catalyst continuously throughout the reaction. An approximation of these conditions may be obtained by separately preparing the aqueous catalyst solution and adding the solution in increments periodically throughout the reaction.

It is desirable to conduct the polymerization under conditions regulated so that the particles of copolymer formed are finely divided particles which are readily separated from the aqueous medium by filtration. The desired product may be achieved by careful selection of the dispersing agent. Although a wide variety of dispersing agents are known and available for use, it has been found that desirable results are achieved through the use of the alkali metal salts of formaldehyde condensed aromatic sulfonic acids. Desirable results can be achieved through the use of 0.05 to 0.50 percent based on the weight of the monomer charged, but optimum performances have been obtained with concentrations between 0.08 and 0.15 weight percent. The dispersing agent may be charged into the polymerization reactor at the beginning of the reaction, or it may be added continuously, or periodically, throughout the course of the reaction.

The polymerization method may also be practiced by the use of molecular weight regulators, which act as chain terminators and prevent the formation of very large molecular weight increments. Such compositions are the high molecular weight aliphatic mercaptans, carbon tetrachloride, and dithioglycidol.

The polymerizations are preferably initiated by charging the aqueous medium containing the dispersing agent and a portion of the catalyst and heating the mixture to the approximate temperature of polymerization, for example 65 to 90° C. A mixture of the monomers or separate streams of the two monomers are then gradually introduced and the reaction allowed to proceed. The monomers are added at approximately the rate of polymerization so as to maintain within the reactor the desired uniform concentration of each monomer. After all the monomer had been added it is sometimes desirable to continue the reaction for a short period of time to assure a substantially complete polymerization. The reaction mixture is then steam distilled to remove traces of unreacted monomers and the polymers then separated from the aqueous medium by any conventional method. Under ideal conditions a solid may be readily filtered from the aqueous medium.

Polymerizations are preferably conducted in glass or glass-lined steel vessels, which are provided with an efficient means for agitation. Generally rotary stirring devices are not desirable but any means for agitating the contents of the vessel to insure intimate contact of the reagents may be employed. In general the polymerization procedure may be conducted by methods and equipment well known to the art.

Further details of the practice of this invention are set forth with respect to the following examples:

Example 1

A 2-liter reaction flask was charged with 800 grams of distilled water and 0.2 gram of the sodium salt of a formaldehyde-naphthalene sulfonic acid condensate. A separately prepared solution containing 180 grams of acrylonitrile, 20 grams of (carbovinyloxymethyl) triethylammonium chloride, two grams of azo-2,2'-diisobutyronitrile, and 0.2 gram of t-dodecylmercaptan was added thereto at a uniform rate over a period of three hours. The reaction mixture was rapidly cooled and filtered. The filter cake was washed thoroughly with water and dried at 75° C. for sixteen hours. A yield of 85 percent of a copolymer containing approximately 93 percent acrylonitrile and seven percent of the vinyl ester was obtained. Fibers produced by spinning the copolymer from a solution of dimethylacetamide into a mixture of 67 percent dimethylacetamide and 33 percent water were prepared. After stretching the fibers were found to have a 4.0 grams per denier tenacity, 5.35 percent boil shrinkage and six to eight percent elongation. The fiber (one gm.) was found to be readily dyeable and a good shade of scarlet was produced by an immersion of one hour at 100° C. in a dye bath prepared by mixing one ml. of two percent Wool Fast Scarlet solution, 5 mls. of three percent sulfuric acid and 40 mls. of water.

Example 2

Using a batch copolymerization technique a mixture of 170 grams of acrylonitrile and 30 grams of (carbovinyloxymethyl) trimethylammonium chloride was polymerized in the presence of two grams of azo-2,2'-diisobutyronitrile, 0.2 gram of tertiary dodecylmercaptan, 0.2 gram of sodium salt of a formaldehyde-naphthalene sulfonic acid condensate, and 800 grams of water. The reaction was conducted at 75° C. for two hours and the copolymer which was prepared in 75 percent yield (95 percent acrylonitrile-five percent vinyl chloroacetate-trimethylamine salt) was spun into fibers which had in the oriented conditions tenacities of 3.79 grams per denier and were readily dyeable with acid dyes.

Example 3

A glass reaction vessel with a 2-liter capacity was charged with 400 grams of distilled water and 0.2 gram of a sodium salt of a formaldehyde-naphthalene sulfonic acid condensate. While maintaining the reaction mixture under agitation and at 81° C. a mixture of 160 grams of acrylonitrile containing 0.4 gram of t-dodecyl-mercaptan and 380 grams of an aqueous solution containing 40 grams of the (carbovinyloxy-methyl) trimethylammonium chloride salt in 340 grams of distilled water were added over a period of one and one-half hours as separate streams. During the reaction a solution of two grams of potassium persulfate and 60 grams of water was added in six separate increments at intervals of fifteen minutes. After all reactants were combined the mixture was refluxed for one-half hour, cooled rapidly, filtered, washed with water and dried. The polymer so obtained contained 91 percent acrylonitrile and nine percent of the salt of vinyl chloroacetate and trimethylamine and was found to be capable of spinning into fibers, which fibers were readily dyed by conventional acid dyes.

The invention is defined by the following claims.

1. A copolymer of 75 to 98 percent acrylonitrile and from two to 25 percent of a compound having the structural formula:

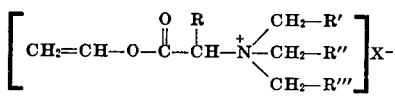

wherein R', R'' and R''' are radicals of the group consisting of hydrogen, methyl, and hydroxymethyl, R is a radical of the group consisting of hydrogen and alkyl radicals having up to six carbon atoms, and X is a halogen of the group consisting of bromine, chlorine and iodine.

2. A copolymer of 75 to 98 percent acrylonitrile and from two to 25 percent of a (carbovinyloxy-methyl) trialkylammonium chloride wherein the alkyl radicals have up to two carbon atoms.

3. A copolymer of 75 to 98 percent acrylonitrile and from two to 25 percent of (carbovinyloxy-methyl) triethylammonium chloride.

4. A copolymer of 75 to 98 percent acrylonitrile and from two to 25 percent of (carbovinyloxy-methyl) trimethylammonium chloride.

5. A method of preparing a dyeable copolymer, which comprises contacting from 75 to 98 percent by weight of acrylontrile with from two to 25 percent of a compound having the structural formula:

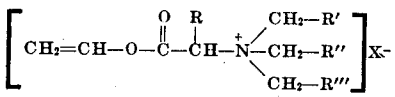

wherein R', R'' and R''' are radicals of the group consisting of hydrogen, methyl, and hydroxymethyl, R is a radical of the group consisting of hydrogen and alkyl radicals having up to six carbon atoms, and X is a halogen of the group consisting of chlorine, bromine and iodine, heating the monomers in an aqueous medium in the presence of a free radical catalyst, and recovering the resulting copolymer.

6. A method of preparing a copolymer of 75 to 98 percent acrylonitrile and two to 25 percent of a (carbovinyloxymethyl) trialkylammonium chloride wherein the alkyl radicals have up to two carbon atoms, which comprises heating the monomers in an aqueous medium in the presence of a free radical catalyst, and recovering the resulting copolymer.

7. A method of preparing a copolymer of 75 to 98 percent acrylonitrile and two to 25 percent of a (carbovinyloxymethyl) triethylammonium chloride, which comprises heating the monomers in an aqueous medium in the presence of a free radical catalyst, and recovering the resultant copolymer.

8. A method of preparing a copolymer of 75 to 98 percent acrylonitrile and two to 25 percent of a (carbovinyloxymethyl) trimethylammonium chloride, which comprises heating the monomers in an aqueous medium in the presence of a free radical catalyst, and recovering the resultant copolymer.

GEORGE E. HAM.

REFERENCES CITED

The following references are of record in the file of this patent:

UNITED STATES PATENTS

| Number | Name | Date |
|---|---|---|
| 2,138,763 | Graves | Nov. 29, 1938 |